Figure 1:
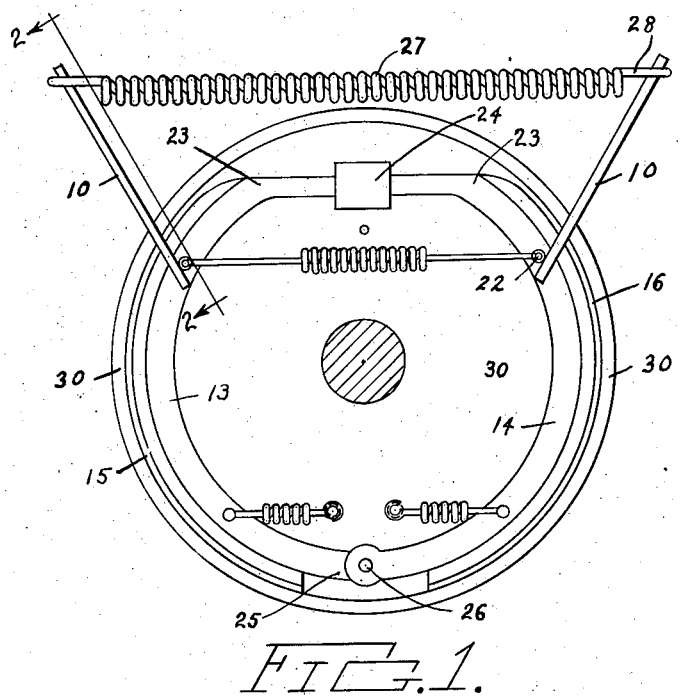

July 19, 1949.  R. D. BOYD  2,476,533

BRAKE SHOE CLAMP

Filed Nov. 22, 1946

Inventor

RAYMOND DALEY BOYD.

By Howard J. Whelan.

Attorney

_Patented July 19, 1949_  2,476,533

UNITED STATES PATENT OFFICE 2,476,533

BRAKE SHOE CLAMP

Raymond Daley Boyd, San Antonio, Tex.

Application November 22, 1946, Serial No. 711,779

5 Claims. (Cl. 29—286)

This invention relates to brake equipment for vehicles and more particularly to a brake shoe clamp jack unit.

The purpose of such a clamp unit is to hold brake shoes of a brake assembly set in place, without any other device to help in the matter, so an operator can repair or replace them easily by himself.

It is an object of this invention to provide a new and improved brake shoe clamp jack unit that will avoid one or more of the disadvantages or limitations of the prior art.

Another object of the present invention is to provide a new and improved brake shoe clamp jack unit that will enable hydraulic brake shoes to be detached or replaced in such a manner as to prevent the brake fluid from escaping from the brake system, or otherwise materially disturbing it.

A further object of the invention is to provide a new and improved brake shoe clamp unit that will facilitate the mounting of brake shoe sets without materially disturbing their incidental elements providing the necessary coupling to keep them operably in position when the shoe set is assembled.

Other objects will become apparent as the invention is more fully described.

For a better comprehension of the invention, reference is made to the drawings, wherein a particular form is illustrated by way of example, and detailed in the following description. The claims emphasize the scope of the invention.

Figure 2:
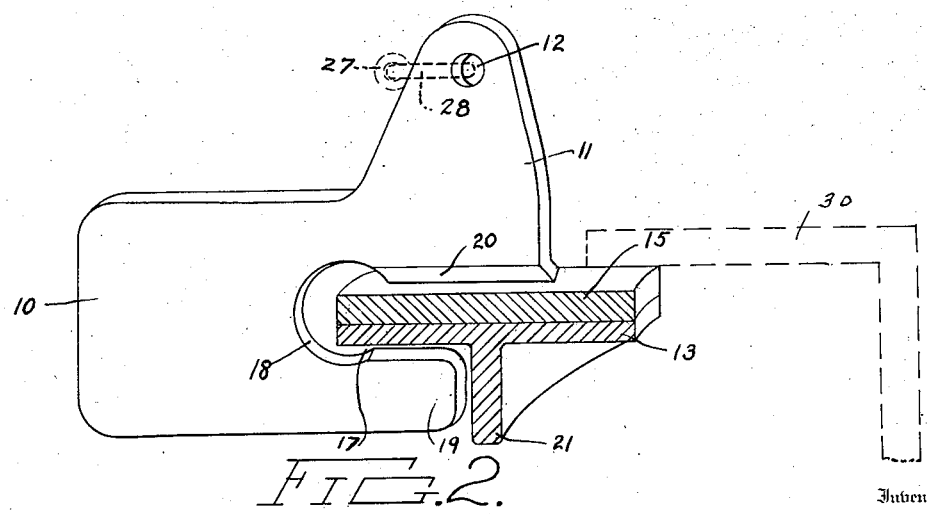

Referring to the drawings:

Figure 1 is a front elevation of a brake mounting plate showing a set of brake shoes and linings positioned on said mounting plate through the aid of clamp jacks embodying this invention; and Figure 2 is a perspective view of one jack clamp positioned on a section of a brake shoe and lining.

Similar reference characters refer to the same parts throughout the drawings.

During the replacement of brake shoe sets on a vehicle, that have been repaired, the usual method employed requires that the operator assemble one brake shoe in place on the mounting plate first, and hold it firmly in place with one hand. He then reaches for the second brake shoe to complete the set, with the other hand, that is free, brings it up into position for placement by himself alone. The work is considered a one man job. Then both hands are needed, so he manipulates his knee, elbow or forearm to retain the first brake shoe in place, while he removes the first hand to use it with the other hand to get the second brake shoe onto the mounting plate and hinged to the first shoe. He then attempts to attach the coil spring intended to hold both shoes placed in a set. This involves the use of both hands and during the process he must let go of the bake shoes to accomplish it. Since the shoes must be held in place while the spring is being attached, the operator uses such other parts of his body, that he considers suitable and available for the purpose, together with such skill in doing so as he can command. This may involve the use of his feet, knees and hands together, working awkwardly, inconveniently, and precariously. Frequently the operation, does not succeed, until after many trys, during which time the braking fluid is lost and injury may be done to the operator.

In this invention, clamp jacks are used, that are readily placed to positively hold the parts so the brake shoes may be placed in position conveniently, easily and rapidly. It avoids the troubles incurred in the conventional method previously described.

Referring to the drawings, in which a particular form of the invention is indicated, a brake-shoe clamp jack 10 consists of a flat piece of metal or other suitable material having a generally rectangular form with an upwardly extending lug 11 having a spring anchor hole 12 perforated in it. It is used for holding each brake shoe flange 13 and 14 respectively to its respective lining 15 or 16, as the case may be. The open and rigid mouth like orifice 17 at the lower portion of the clamp jack 10 enables it to slip over the shoe flange and lining easily to accomplish this. The orifice 17 recesses back into the rectangular form in a longitudinal direction and terminates in an enlarged arcuate opening 18 as indicated in Figure 2. The lower jaw 19 of the orifice 17 is retracted back of the upper jaw 20 in order to avoid interference with the web 21 of the brake shoe. The jaw 20 is bent slightly on an angle and out of line with lower jaw 19 to prevent the device from slipping. The clamp jacks are mounted transversely over each shoe flange and lining adjacent the pins 22 as shown in Figure 1, near the upper portions 23 of the brake shoes. The so-called upper portions 23 are those coupled to the hydraulic cylinder 24. The bottom portions 25 of the brake shoes are held together with a pin 26 and serve to provide a hinge arrangement for the brake shoes in a set.

A coil spring 27 with shank and hooks 28, is tensioned when hooked into the holes 12 and pulls the brake shoes of the set at the upper portions 23, towards the cylinder 24, through its offset pulling action on the clamp jacks 10. The clamp jacks are stressed laterally and bind the jaws 19 and 20 against the linings 15 and 16 and flanges 13 and 14 in a torsional direction, when the spring 27 is tensioning them together, while the lined brake shoe set is being assembled on the brake mounting plate 30.

When the brake shoes are assembled into a set and in place on the mounting plate 30, the clamp jacks are easily removed by pulling them backwards. This makes them slip off the linings and flanges, with the spring 27, ready for further use on another brake assembly.

The clamp jack unit consists of three parts, namely, two clamp jacks 10 and a tensioning spring 27. They are operated and used without tools, and can be placed in position by the hands of the user by the simple process of pushing the jaws over the brake shoe flanges and linings. After which they are manipulated to place them in position. This does not require much effort and can be done with the spring 27 attached or not attached, whichever may be necessary or preferred. When the complete unit is attached to the assembled brake shoe sets it is brought to the brake mounting plate and mounted thereon with little or no trouble. Slight variations in the sequence of the assembling of the unit may be required for different brakes, but in general, the same steps in the process are followed, although in different sequence. There are usually three springs holding the brake shoe flange 14 tensioned together. The upper spring is termed the long spring and loops over the pins 22 on the two flanges and are horizontally oposite each other in Figure 1. The other two springs are small and each are also attached at one end to a stationary pin on a brake housing or mounting plate 30. The opposite ends are each secured on a pin on the flanges 14 and 13 respectively as shown in Figure 1. These latter springs are located adjacent the hinge portion 25 of the brake shoes. The last two springs are detached when the brake shoes are removed for any purpose, and form a single brake unit rigidly with all its remaining detachable parts when the clamp device is mounted thereon, as shown in Figure 1.

The clamp jacks fit the shoes so conveniently, that the operator can actuate them in various directions to produce different results, by his hands alone, and with sufficient leverage to enable him to do so easily. This may be accomplished without danger to himself or injury to the brakes.

While but one general form of the invention is shown in the drawings and described in the specifications, it is not desired to limit this application for patent to this particular form or in any other way otherwise than limited by the scope thereof, as it is appreciated that other forms of construction could be made that would use the same principles and come within the scope of the appended claims.

Having thus described the invention, what is claimed is:

1. A clamp unit for vehicle brake shoes comprising a pair of jacks including jaws arranged to slip the flanges of a pair of hinged brake shoes with lining thereon, and a spring mounted on the end portions of said jacks disposed outside of the flanges when placed thereon, said spring being arranged to tension said end portions together and force the jaws against the flanges, whereby the shoes will be held rigidly together in their normal positions.

2. A clamp unit for vehicle brake shoes comprising a pair of jacks including jaws arranged to slip the flanges of a pair of hinged brake shoes with lining thereon, and a spring mounted on the end portions of said jacks disposed outside of the flanges when placed thereon, said spring being arranged to tension said end portions together and force the jaws against the flanges, whereby the shoes will be held rigidly together in their normal positions, said jaws being of slotted form penetrating the jacks transversely to allow each flange to enter to its full width and engage one of the parts of the jaws at its limit of insertion, and the other part freely over to a larger area of the lining whereby said parts will closely grip the lining and flange between them.

3. A clamp unit for vehicle brake shoes comprising a pair of jacks including jaws arranged to slip the flanges of a pair of hinged brake shoes with lining thereon, and a spring mounted on the end portions of said jacks disposed outside of the flanges when placed thereon, said spring being arranged to tension said end portions together and force the jaws against the flanges, whereby the shoes will be held rigidly together in their normal positions, said jaws being of slotted form penetrating the jacks transversely to allow each flange to enter to its full width and engage one of the parts of the jaws at its limit of insertion, and the other part freely over to a larger area of the lining whereby said parts will closely grip the lining and flange between them, the position of the spring on the end portions being such as to exert a leverage on the jaws and substantially stress the jaws against said flanges and linings.

4. A clamp unit for vehicle brake shoes comprising a pair of jacks including jaws arranged to slip the flanges of a pair of hinged brake shoes with lining thereon, and a spring mounted on the end portions of said jacks disposed outside of the flanges when placed thereon, said spring being arranged to tension said end portions together and force the jaws against the flanges, whereby the shoes will be held rigidly together in their normal positions, said jaws being of slotted form penetrating the jacks transversely to allow each flange to enter to its full width and engage one of the parts of the jaws at its limit of insertion, and the other part freely over to a larger area of the lining whereby said parts will closely grip the lining and flange between them, the position of the spring on the end portions being such as to exert a leverage on the jaws and substantially stress the jaws against said flanges and linings, the position of the jacks being angular to one another when placed on the brake shoes with the portions to which the spring is attached being spaced further apart the portions in which the jaws are disposed, the portions of the jacks including the jaws being slotted backwardly from the flanges to enable the jaws to be long enough to encompass them and provide an excess space therefor.

5. A clamp unit for vehicle brake shoes comprising a pair of jacks including jaws arranged to slip the flanges of a pair of hinged brake shoes with lining thereon, and a spring mounted on the end portions of said jacks disposed outside of the flanges when placed thereon, said spring being arranged to tension said end portions together and force the jaws against the flanges, whereby the shoes will be held rigidly together in their normal positions, said jaws being of slotted form penetrating the jacks transversely to allow each flange to enter to its full width and engage one of the parts of the jaws at its limit of insertion, and the other part freely over to a larger area of the lining whereby said parts will closely grip the lining and flange between them, the position of the spring on the end portions being such as to exert a leverage on the jaws and substantially stress the jaws against said flanges and linings, the position of the jacks being angular to one another when placed on the brake shoes with the portions to which the spring is attached being spaced further apart the portions in which the jaws are disposed, the portions of the jacks including the jaws being slotted backwardly from the flanges to enable the jaws to be long enough to encompass them and provide an excess space therefor, said jacks being loosely held together by the spring when not in use, and enabling the said jacks to be applied one at a time during attachment to a brake shoe set.

RAYMOND DALEY BOYD.

REFERENCES CITED

The following references are of record in the file of this patent:

UNITED STATES PATENTS

| Number | Name | Date |
| --- | --- | --- |
| 1,663,602 | Kunkel | Mar. 27, 1928 |
| 2,359,996 | Marnell | Oct. 10, 1944 |